INVENTOR.
HERMAN R. WEED,
BY
ATTORNEYS.

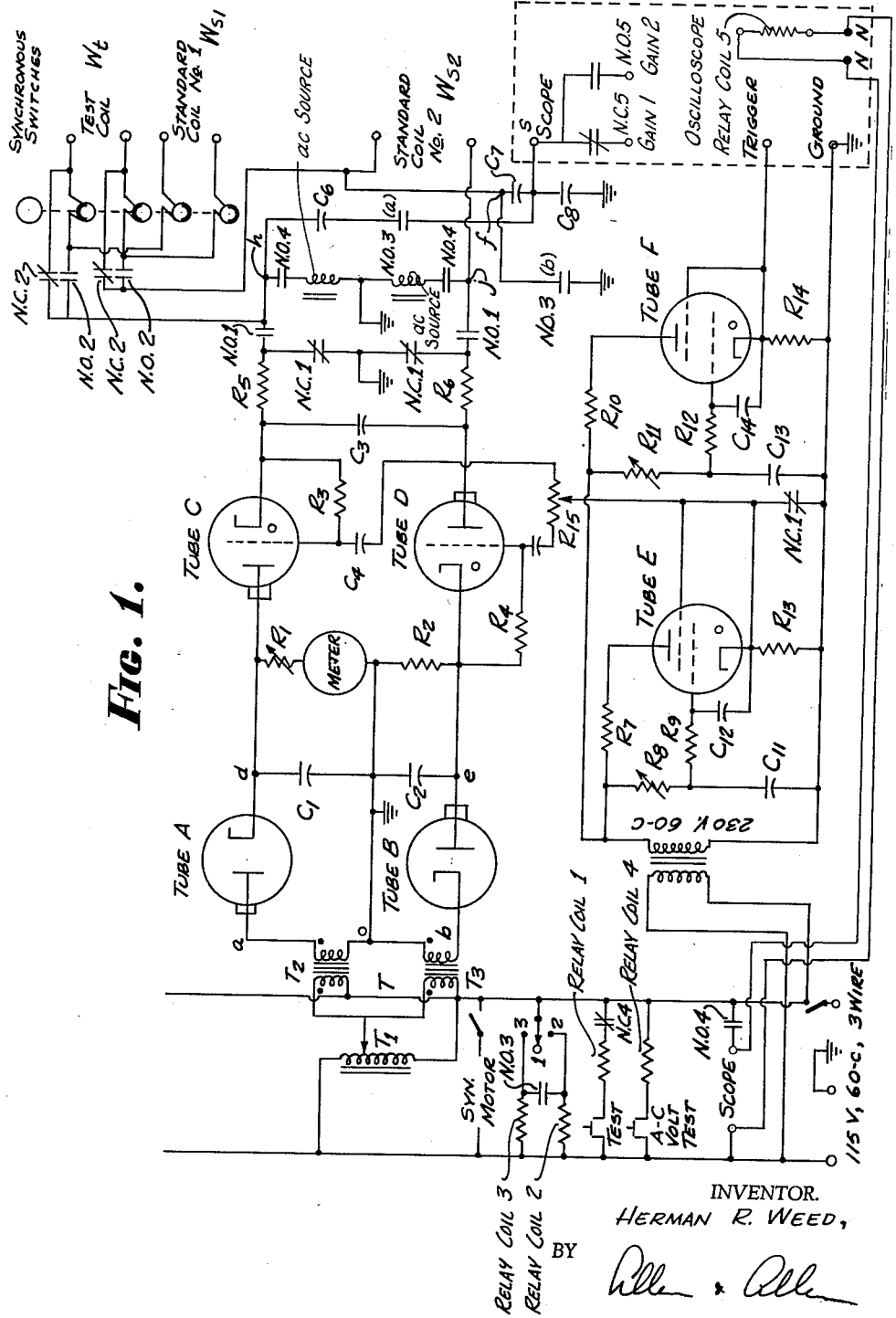

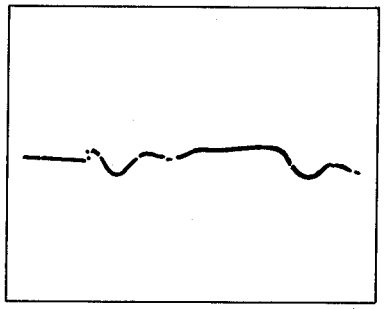
*FIG. 4a.*
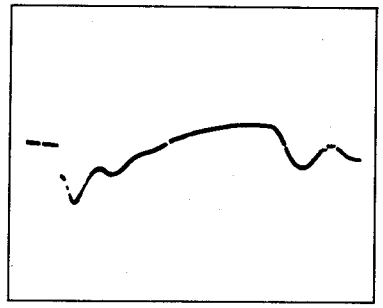
*FIG. 4b.*
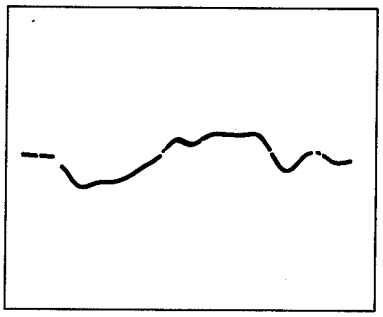
*FIG. 4c.*
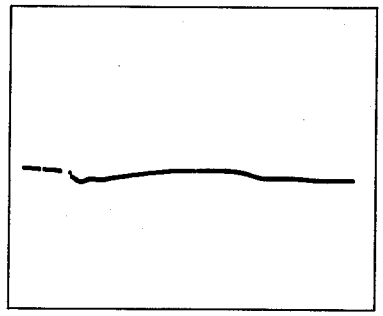
*FIG. 4d.*
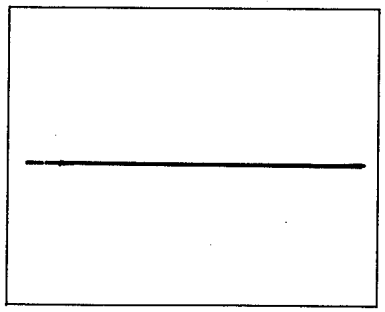
*FIG. 4e.*
INVENTOR.
HERMAN R. WEED,
BY
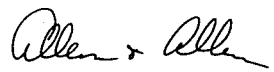
ATTORNEYS.

July 17, 1962  H. R. WEED  3,045,177
TESTING DEVICE FOR ELECTRICAL WINDINGS AND THE LIKE
Filed Aug. 19, 1959   5 Sheets-Sheet 5

INVENTOR.
HERMAN R. WEED,
BY
ATTORNEYS.

United States Patent Office 3,045,177
Patented July 17, 1962

3,045,177
TESTING DEVICE FOR ELECTRICAL WINDINGS
AND THE LIKE
Herman R. Weed, Columbus, Ohio, assignor to Robbins & Myers, Inc., Springfield, Ohio, a corporation of Ohio
Filed Aug. 19, 1959, Ser. No. 834,731
5 Claims. (Cl. 324—54)

This invention relates to a testing device for electrical windings and the like and more particularly to an electronic device for applying to a coil or winding to be tested a surge voltage, while at the same time applying a like surge voltage to a standard coil or winding and observing a signal proportional to the instantaneous differences of the potentials across the two windings on a synchronized oscilloscope. By means of a synchronous switch, the device can also be made to apply surge voltages to a test and standard winding, and to two standard windings alternately, so as to observe a signal proportional to the difference in each case and compare the differences. It is also possible to observe the total surge voltage applied to the standard and to the test winding alternately, and to observe the difference between the two. This invention also provides for the application of a 60 cycle voltage to a test and standard winding in a bridge circuit with the oscilloscope as a detector to measure differences in 60 cycle impedances. The present application is a continuation-in-part of my copending application, Serial No. 441,058 filed July 2, 1954, now Patent No. 2,901,695 dated August 25, 1959.

The surge voltage generator operates on the principle of repetitive discharging of a charged capacitor into the coil or winding to be tested. Thus, the initial magnitude of the surge voltage and the energy which must be dissipated in the coil under test are determined exactly by the size of the capacitor and the charge on its plates. Also, conventional 60 cycle voltage may be applied to an A.C. impedance bridge, for purposes which will be pointed out hereinafter.

When this surge voltage is applied to a winding to be tested, the time variation of voltage across the coil to be tested depends upon its exact electrical properties including the number and direction of turns, the insulation of each point on the coil to ground and to every other point on the coil, the connections of the winding parts to the commutator, if the winding be an armature, the wire size, series and parallel paths, and in effect every possible factor which contributes to the electrical characteristics of the winding. The electrical behavior of the coil or winding, when subject to the surge voltage, indicates in a combined result the effect of all these factors, and any deviation in the coil or winding characteristics will produce a change of some sort in its electrical behavior. If this behavior of the winding can be observed, as for example on an oscilloscope screen, such deviations would be detectable.

However, the deviations are difficult and often impossible to detect because of their small size as compared to the normal pattern of voltage or current variation. By the use of the principle of null detection or difference measurement which emphasizes deviations from the normal patterns and suppresses those pattern components which are due to normal and desired electrical properties, the deviations can be more readily observed. When identical surge voltages are thus applied to a standard coil or winding having desired qualities, and to a coil or winding under test, the instantaneous difference of the potentials across the two windings is observed on a synchronized oscilloscope and if there is a deviation in the electrical properties of the coil under test, a recognizable difference pattern of a particular shape will be produced.

Under certain conditions even greater sensitivity may be desired. This may be achieved by a provision for comparing the characteristic null patten of the test and standard windings with the characteristic null pattern from two standard windings. In some cases it also may be of interest to observe, or to have available for measurement, the total voltages across either the test and standard windings alternately or simultaneously. For certain windings, it will be desirable to be able to apply a 60 cycle steady state sinusoidal voltage, and to observe the difference between the two by a conventional A.C. bridge circuit.

With the foregoing considerations in mind, it is an object of the present invention to provide a testing device for testing various electrical properties of a coil or winding. It is another object of the invention to provide a device by means of which the electrical behavior of a coil or winding to be tested may be compared with the electrical behavior of a standard coil or winding in such a manner that a characteristic pattern will appear on an oscilloscope screen, from which pattern the characteristics and qualities of the coil under test may be determined. Generally, it is an object of the present invention to provide an apparatus which is more flexible and more versatile than that of my said copending application.

It is another object of the invention to provide an electronic apparatus for applying sudden surge voltages to standard coils and coils under test and to apply a signal dependent upon the difference between potentials across the test and standard coils to the input of an oscilloscope. It is also an object of the invention to provide for varying and metering the value of the voltage which is applied to the windings. It is also an object to provide the actual voltages across the test and standard windings for observation or measurement.

Still another object of the invention involves the provision of a trigger circuit to control the application of the surge voltages above referred to and also to trigger the sweep of the oscilloscope.

Still another object involves the provision of an apparatus as above outlined which will be simple and safe in operation and inexpensive in construction and maintenance.

These and other objects of the invention which will be pointed out in greater detail hereinafter or which will be apparent to one skilled in the art upon reading these specifications, are accomplished by that certain construction and arrangement of parts and by that series of method steps of which an exemplary embodiment will now be described.

Reference is made to the drawings forming a part hereof and in which:

FIGURE 1 is a general wiring diagram of the apparatus.

Figure 3A:
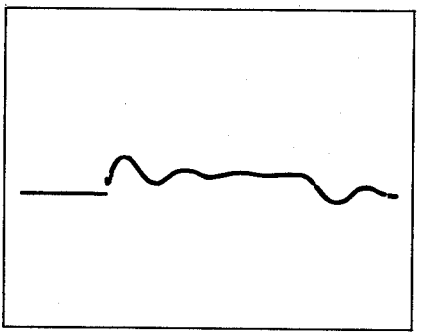

FIGURES 3 to 8 inclusive show the appearance of the oscilloscope screen under various conditions to indicate the different patterns which may be found.

Identical but separate supply voltages are applied through separate rectifier tubes to the two discharge capacitors. Means are provided to adjust the primary voltage of the supply transformer so that the capacitors may be charged to any predetermined peak voltage, say from 200 to 2,000 volts and this voltage continuously metered. The common point between the discharge capacitors is grounded and from one capacitor a discharge path leads to a standard coil and from the other capacitor a duplicate discharge path leads to the coil to be tested or alternate standard coil, and the common point between the coils in the two discharge paths is connected to the input of an oscilloscope by means of a capacitor divider to ground. A separate trigger circuit is provided to trigger the discharge of the discharge capacitors as well as the sweep of the oscilloscope. The two identical surges of voltage applied to the coils are of opposite polarity with respect to ground so that, the two windings being in series, the potentials of their common point with respect to ground may be observed. The two surges are simultaneously applied to the two coils with a potential difference across the two coils of the sum of the voltages on the discharge capacitors, accomplished by two sets of triggered thyratrons. A synchronous switch with four contacts is provided in the one discharge path along with relay contacts to provide the option of the surge appearing across the test coil or alternately across the test coil and the standard coil. While, as described herein, only one thyratron is used in each discharge path, it would of course be feasible, and under some conditions might be desirable, to use two or more thyratrons.

By means of relay contacts it is possible to remove the surge voltage source and to apply the 60 cycle voltage source across a standard coil and either the test coil or another standard coil, depending on the operation of the relay contacts and the synchronous switch contacts. A relay also provides an arrangement so that the oscilloscope can observe a voltage proportional to the total surge voltage across either the test coil or one of the standard coils, depending on the operation of the relay contacts and the synchronous switch contacts.

The two discharge capacitors are recharged once each cycle from a 60-cycle per second supply and the triggering of the thyratrons is carefully synchronized with the 60-cycle source so that electrical connection to the supply line is impossible during the surge application. A trigger, or synchronizing pulse, which may be a separate trigger, is also provided to excite the trigger sweep circuit of the oscilloscope.

Referring now in more detail to the drawings, the supply transformers for the discharge capacitors are indicated at $T_2$ and $T_3$. The primary voltage of these transformers may be adjusted by means of a continuously variable transformer indicated at $T_1$, the transformer $T_1$ being connected to a commercial 60-cycle supply. The charge on the capacitors to produce any predetermined peak voltage may be determined by adjustment of the transformer $T_1$. The four dots associated with $T_2$ and $T_3$ simply indicate that these four points are of the same polarity of voltage relative to the other terminal of that coil at any given moment.

The secondaries of the transformers $T_2$ and $T_3$ are connected to the two discharge capacitors $C_1$ and $C_2$ through rectifier tubes A and B with a common ground point. The capacitors $C_1$ and $C_2$ will be charged to near the maximum value of the supply voltage across the terminals $oa$ and $bo$ respectively each time the point $a$ is positive with respect to the point $b$. The rectifier tubes A and B will not permit the discharge capacitors $C_1$ and $C_2$ to discharge through the source nor will they connect the capacitors to the terminals $a$ and $b$ for nearly a complete cycle or until they have been discharged into the test coils. The common point of the capacitors $C_1$ and $C_2$ is grounded as shown, and it is the potential of the points $d$ and $e$ with respect to ground that will institute the surge voltage. It should be noted that the point $d$ is positive with respect to ground while the point $e$ is negative with respect to ground. It is essential that the capacitors $C_1$ and $C_2$ be as nearly identical as possible. A D.-C. meter movement in series with the variable resistance $R_1$ provides for metering the voltage on $C_1$.

The discharge path into the test coil or winding $W_t$ is through the tube C. Similarly, the discharge path into the standard coil or winding $W_{s2}$ is through the tube D. It will be observed that the direction of the tube D in the circuit is opposite to that of the tube C, since the polarity of voltage on the capacitor $C_2$ is opposite to that on the capacitor $C_1$ as far as the discharge tubes are concerned.

The number of tubes is not important to the operation of the circuit except for the requirement that they must have the required forward breakdown voltage of up to 2,000 volts as a group or whatever maximum value is chosen in the circuit design, their ionization time must be short (preferably less than 0.1 microsecond), they must be capable of withstanding repetitive current surges of the value as determined by the circuit, and their replacement cost should be low. Various single, double and multiple tubes meet these specifications. The tubes here described are type 3C45 hydrogen thyratrons. Between tube C and the test coil $W_t$ and between tube D and the standard coil $W_{s2}$, there are provided resistors $R_5$ and $R_6$ to limit the current to protect the thyratrons C and D from overrated surges in the case of ground faults or other low impedance failures of the coils.

The common point between the coils $W_t$ and $W_{s2}$ is indicated at $f$ and it is the variation in potential of the point $f$ with respect to ground which is normally observed by the oscilloscope. Contacts of relay 3 may be used to ground the point $f$ and connect the oscilloscope through $C_6$ to observe the total voltage on the test or standard coil as determined by the rotating switch. Since the voltage is of considerable magnitude, a capacitor divider comprising the capacitors $C_7$ and $C_8$ is used between the point $f$ and ground to supply the oscilloscope input $s$ for null observation, and a divider comprising $C_6$, $C_7$ and $C_8$ between the point $h$ and ground for total voltage observation.

The control of the circuit as outlined to this point is of the greatest importance. The tubes C and D must fire as nearly simultaneously as possible. This requires a large grid firing voltage having a very steep wave front and having a relatively low impedance.

The firing pulse is produced by the tubes E and F with their associated circuit components. The tubes E and F may conveniently be thyratrons of the 2050 type. Such thyratrons make the tube replacement problem less difficult and also produce the required low impedance and high power pulse.

The triggering of tubes C and D is accomplished by a trigger pulse from tube E which is controlled in time by the phase shifting circuit comprising the resistors $R_8$ and $R_9$ and the capacitors $C_{11}$ and $C_{12}$ so as to be approximately 180° after the charging peak of the capacitors $C_1$ and $C_2$.

As a matter of safety this pulse is removed by the contacts of the relay 1 when operation is not desired. The pulse is capacity coupled to the grids of the tubes C and D through a balancing potentiometer $R_{15}$. In this way the relative magnitude of the pulse to each tube may be adjusted and thus slight differences in tube characteristics may be compensated.

The capacitor $C_3$ provides for further synchronization of the tubes. Just before the triggering of the tubes, the capacitor C would have essentially zero voltage across it. If the tube C should fire slightly before the tube D, the plate of the tube D would be momentarily raised toward the positive value of the discharge of the capacitor $C_1$. This increases the cathode to plate voltage of tube D and would encourage the tube D to fire if it has not already done so. A similar action would result if tube D fired first (i.e. the cathode potential of tube C would drop). In other words, the capacitor $C_3$ acts as a synchronizing device causing whichever tube is late in firing to fire immediately as a result of the firing of the first tube.

Figure 2:
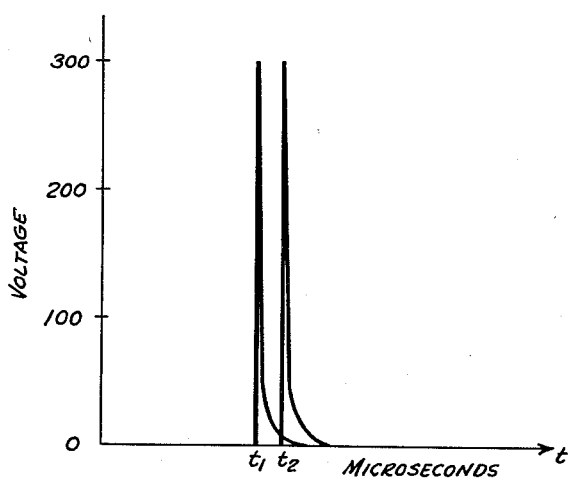
FIGURE 2 is a graph showing voltage plotted against time in microseconds to show the relationship between the triggering pulses of the oscilloscope sweep and the test circuit.

The second tube in the trigger circuit, the tube F, provides a second trigger pulse to synchronize the oscilloscope sweep circuit. The pulse is controlled in time by the phase shifting circuit comprising the resistors $R_{11}$ and $R_{12}$ and the capacitors $C_{13}$ and $C_{14}$ so that it occurs over a range which overlaps the pulse of tube E. It will be understood of course that the reverse combination may be used if desired. Since the pulses of these tubes may be adjusted in time, the resistor $R_{11}$ may be a coarse adjustment and the resistor $R_8$ a similar fine adjustment serving as a vernier. These two adjustments will provide for an adjustmnet between the time the oscilloscope is triggered and the surge discharge is triggered. In this way, the position of the trace on the oscilloscope face may be adjusted. FIGURE 2 indicates a possible adjustment of the two trigger pulses with one occurring at time $t_1$ and the other at time $t_2$. They need not necessarily be of the same magnitude.

There is provided a test switch actuating relay 1 which connects or disconnects the surge voltage source, and an A.-C. voltage test switch operating relay 4 which connects the sixty cycle voltage source. These are manual switches and it will be understood in the drawing that operation of the test switch actuating relay $R_1$ operates all contacts indicated by the subscript 1. Thus, contacts marked $NO_1$ (normally open) will close and contacts marked $NC_1$ (normally closed) will open. The same is true of the A.-C. voltage test switch actuating relay $R_4$ which operates all contacts carrying the subscript 4. With the relay 4 energized, the two series connected A.C. sources between points $h$ and $j$ appear in parallel, either with (a) the test coil and standard coil 2 in series, or (b) the standard coil 1 and standard coil 2 in series depending on the mode of relay 2 and the position of the synchronous switches. The oscilloscope input, $s$, is connected to read a voltage proportional to the difference voltage of the common point $f$ with respect to ground.

Additionally, there is a mode selector switch having positions 1, 2 and 3. Mode 1 is the normal null operation comparing the standard coil number 2 with the test coil. Mode 2 inserts the synchronous switch into the circuit and provides for the comparison of two null signals. Mode 3 makes it possible to observe the total surge voltage of the test coil or alternately of the test coil and standard coil number 1. A pair of terminals marked N are energized through relay 4 so as to apply 115 volts A.C. to a relay in the oscilloscope, connected to change the oscilloscope gain by some suitable factor such as 100/1 for the A.-C. voltage bridge test. The relay coil 5 actuates the contacts marked N.C. 5 and N.O. 5 in the oscilloscope to produce a gain change. Observation of the total voltage on standard coil 2 is available between point $j$ and ground while in mode 3. The closing of relay 3 into mode 3 closes the contacts N.O. 3(a) which connect $C_6$ to point S, and the contacts N.O. 3(b) which connect point $f$ to ground. The signal applied to the oscilloscope at S will then be proportional to the total voltage across the test coil to ground (actually from point $h$ to ground); and point $j$ will have the total voltage of the standard coil 2 to ground available, but it is not connected to the oscilloscope input.

With the 3C45 hydrogen thyratrons, the grid circuit is very simple. No battery bias or limiting resistors are needed and all that is necessary is the provision of simple dropping resistors $R_3$ and $R_4$.

All the heater transformers (not shown) are separate since they must operate with their secondaries at different potentials to ground. The oscilloscope used should have a minimum writing rate of 1 centimeter per microsecond since the discharge transient may last for less than 10 microseconds. It should also have a single shot trigger sweep sensitive to positive pulses.

In its actual operation, the circuit above described may deviate slightly from its theoretical explanation. The tube D may actually fire slightly before or after the tube C. This is probably because of slight differences in the tube characteristics or in circuit components still not adequately compensated. This slight time difference results in a particular voltage fluctuation of the point $f$ that becomes known as the reference pattern to the operator. Such a pattern has the advantage of giving a distinction between normal test results and a failure in the operation of the circuit which would result in an absolute null of zero. It is believed that this is a correct explanation because it has been found that the time difference between the two surges varies slightly with the magnitude of the surge voltage.

Although the pattern observed on the oscilloscope depends upon the type of coil or winding under test and to some extent on the magnitude of the voltage applied, a typical set of curves for a winding under test is shown in FIGURES 3 to 8 inclusive.

The differences in the pattern for the various faults are easily noticed and can readily be distinguished from a normal picture by a relatively untrained operator and in most cases the operator can determine the type and often the location of the fault.

Figure 3B:
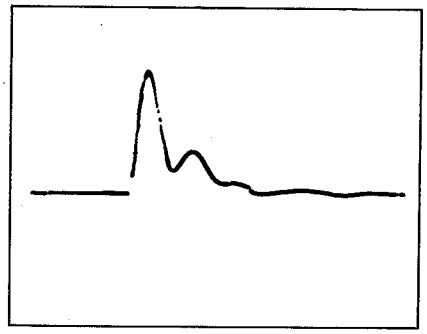
Figure 3C:
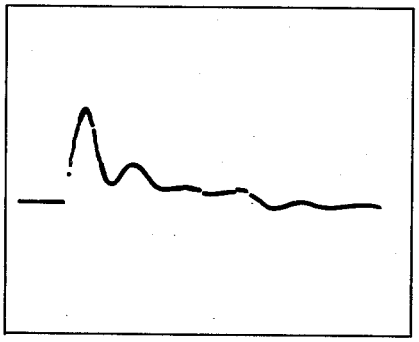
Figure 3D:
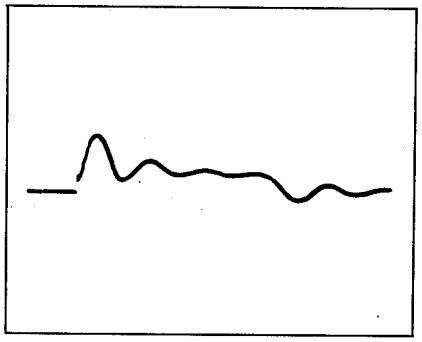

FIGURES 3a to 3d show pictures of an armature under test by mode 1. FIGURE 3a shows the normal pattern; FIGURE 3b shows a short at a point midway between the probe contacts to the commutator; FIGURE 3c a short halfway between the midjoint and the probe contact, and FIGURE 3d a short one-fourth of the distance from the probe contact to the midjoint.

FIGURES 4a to 4c show additional pictures of an armature winding under test by mode 1. Thus, FIGURE 4a shows an open circuit in one path, FIGURE 4b a ground at the high voltage probe, FIGURE 4c a ground halfway between probes, FIGURE 4d a ground near point $f$, and FIGURE 4e a ground at point $f$.

Figure 5A:
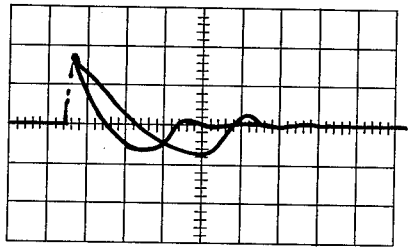
Figure 5B:
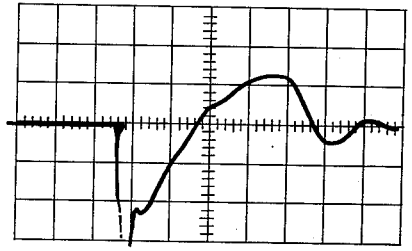
Figure 5C:
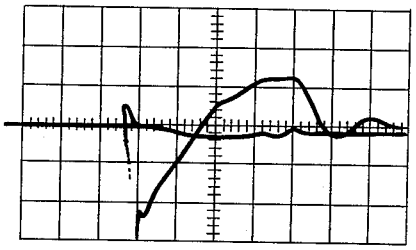

FIGURES 5a to 5c show a field winding under test, exhibiting a grounded winding, with FIGURE 5a, by mode 3, FIGURE 5b by mode 1, and FIGURE 5c by mode 2.

Figure 6A:
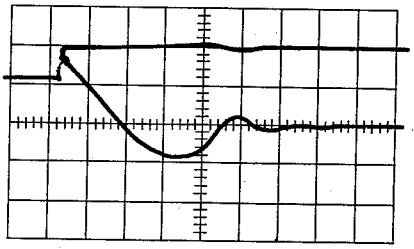
Figure 6B:
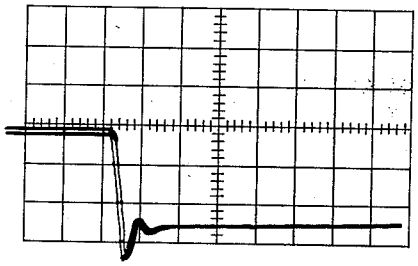
Figure 6C:
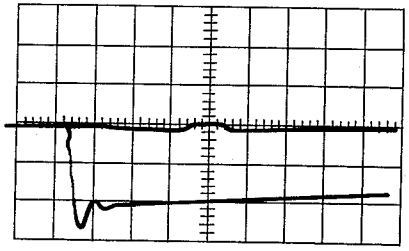

FIGURES 6a to 6c illustrate a field winding with an open winding, using the three modes.

Figure 7A:
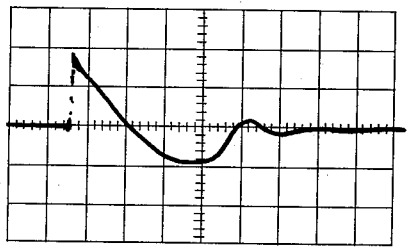
Figure 7B:
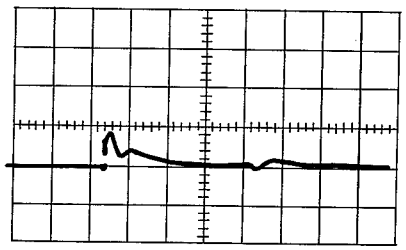
Figure 7C:
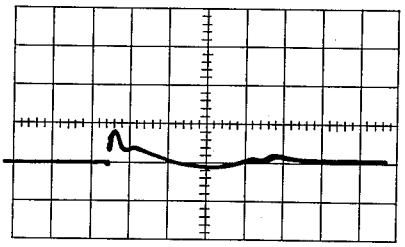

FIGURES 7a to 7c show normal field windings with the three modes.

Figure 8A:
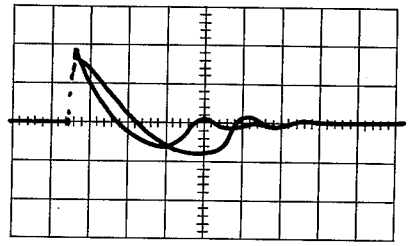
Figure 8B:
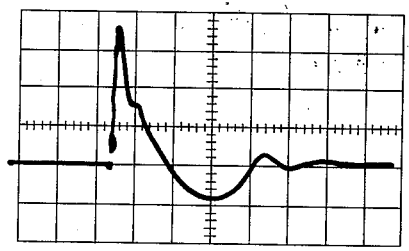
Figure 8C:
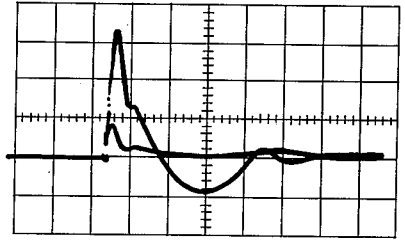

FIGURES 8a to 8c show a shorted field winding using the three modes.

The relation between the pattern change and the location of the fault is dependent upon the type of fault. Thus, for example, a ground in a test armature is most noticeable when nearest the brush making contact with the resistor $R_5$ and it is least noticeable at the point $f$. On the other hand, a short between turns is least noticeable when near a brush since the brush shorts adjacent commutator bars during normal rotation. In other words, the picture on the screen rises and falls twice during one revolution of the armature from a normal indication to a "short" indication. The sensitivity of the apparatus can be adjusted by having the brushes separated by amounts differing from 180° depending somewhat on the type of winding under test.

While I have described the circuit and the apparatus in considerable detail, it will be understood that certain modifications may be made without departing from the spirit of the invention and I therefore do not intend to limit myself otherwise than as set forth in the claims which follow.

Having now fully described my invention, what I claim as new and desire to secure by Letters Patent is:

1. A testing device for electrical windings comprising a pair of substantially identical discharge capacitors and a rectifier in series with each of said capacitors, a transformer for supplying each of said rectifiers and capacitor pairs, a ground connection between said capacitors, a means for metering the voltage of one of said capacitors, means for charging said capacitors through their respective rectifiers, a discharge path for each of said capacitors, coupled across said capacitor, each of said paths comprising at least one electron device having a control terminal, the anodes and cathodes of the electron devices in the respective discharge paths being reversely connected, a trigger circuit including two electron devices and associated passive components producing two steep wave front voltage pulses, one of which is resistance-capacitance coupled through a balancing potentiometer to the said control terminals to synchronize the firing of said electron devices in said paths, the other of which is made available for detector synchronization, a synchronizing capacitor connected between the two discharge electron devices to make their firing more nearly simultaneous, terminals for two standard coils and terminals for the connection of a coil to be tested, means connected to the discharge path for applying the simultaneous surge voltages resulting from the discharge of said capacitors alternatively one to the terminals for the test winding and one to the terminals for a standard winding, or, one each to the terminals for two standard windings, or, one to the terminals for a standard winding and the other alternately to the terminals for the test winding and to the terminals for a second standard winding, means for replacing the two simultaneous surge voltages with two alternating voltages in the same alternative combinations, an oscilloscope having one input terminal grounded and means for applying signals proportional to the said surge or alternating voltages or their differences to another of the input terminals of said oscilloscope and means for applying to said oscilloscope the steep wave front voltage pulse from said trigger circuit which is made available for detector synchronization.

2. A testing device according to claim 1, wherein a relay is coupled to said oscilloscope to change the oscilloscope gain by a multiplying factor incident to the application of an alternating voltage to said coils, whereby a relatively low voltage test may be made.

3. A testing device according to claim 1, wherein means are provided to substitute an A.C. voltage for the surge voltages, operative connections are provided to connect said oscilloscope as a detector in a bridge circuit with said test and standard windings.

4. A testing device according to claim 1, wherein said synchronizing capacitor is provided between the cathode of one of said discharge electron devices and the anode of the other said discharge electron device on the side of said devices toward the said standard windings and winding to be tested, whereby the anode to cathode voltage of the electron device which is late in firing is increased to encourage the ionization of the late firing electron device whereby to improve the synchronization of firing of the two discharge electron devices.

5. A testing device according to claim 1, wherein the means for applying signals proportional to the said surge or alternating voltages or their differences to the input terminals of the oscilloscope include a rotating switch, whereby a trace may be created on said oscilloscope by the voltages of the coil to be tested and one of said standard windings or the difference between them.

References Cited in the file of this patent
UNITED STATES PATENTS 2,569,990    Harter _____ Oct. 2, 1951